Jan. 28, 1964  E. L. CLARK  3,119,265
METHOD AND APPARATUS FOR MEASURING A COLUMN OF OIL
Filed Aug. 2, 1961
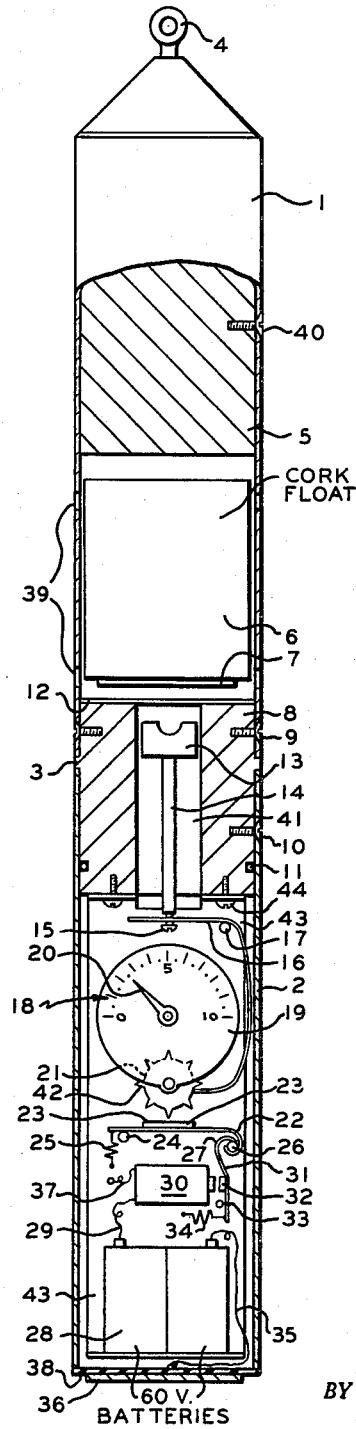
INVENTOR.
E.L. CLARK
BY Hudson & Young
ATTORNEYS

United States Patent Office 3,119,265
Patented Jan. 28, 1964

3,119,265
METHOD AND APPARATUS FOR MEASURING A COLUMN OF OIL
Ernest L. Clark, Bartlesville, Okla., assignor to Phillips Petroleum Company, a corporation of Delaware
Filed Aug. 2, 1961, Ser. No. 128,718
8 Claims. (Cl. 73—290)

This invention relates to a method and apparatus for measuring oil in a well. In one aspect it relates to a very simple and inexpensive apparatus for measuring oil in a well. In another aspect it relates to such an apparatus for use in measuring oil in wells without need for use of electrical lead lines from the ground level to the apparatus in the well.

Many oil-water interface locaters for use in wells, are available, but these devices have the disadvantage of having electrical lead lines running to the ground surface. These electrical lead lines carry electrical signals from the device in the well to complicated and expensive recording surface equipment. As is known in the art ordinary electronic strip chart recorders are quite expensive pieces of equipment.

An object of this invention is to provide a simple and inexpensive well logging device for measuring oil in wells. Another object of this invention is to provide such a logging device for measuring the length of a column of oil in the well without the need for electrical leads from the ground level to the apparatus in the well. Yet another object of this invention is to provide such an apparatus which does not require expensive above-ground chart recorders in conjunction with insulated lead lines extending from the recorders to the logging apparatus in the well. Still other objects and advantages of this invention will be realized upon reading the following description which taken with the attached drawing forms a part of this specification.

I have devised an apparatus for measuring the depth of oil in a well without need for electrical lead lines from the apparatus to ground level and without need for expensive indicating and/or recording above-ground equipment. My device merely determines the length of time required for the device to be lowered through the body of oil in a well and by knowing the rate of descent of the apparatus, the length of the column of oil in the hole is easily determined. I merely provide means for starting a timing device at the instant the apparatus enters the oil in the well and a means for stopping or shutting off the timing device when the apparatus leaves the layer of oil and enters a layer of water.

Many oil wells have been shut-in in retired sections of oil fields. Often there is a need to know the amount of oil which has accumulated in the well during shut-in time or to determine if oil is seeping by a casing plug. One method now used to determine the length of a column of oil in a well is to use a liquid sampler run on a wire line. The use of such a sampler requires many trips into the well. In such an operation the sampler is run into the well and a sample brought to the surface. If the sample is only oil then the sampler must be dumped of its load of oil and the sampler again run into the well and to a lower or greater depth. Upon withdrawing the sampler again if only oil is present, then the operation must be repeated time after time until water is present in the sampler. The depth to which the sampler was run in this latter case then is the depth at which the oil-water interface is in the well. Also, to determine the top surface of the oil in the well, the sampler is run into the well to different depths until a sample of oil is obtained. Then by subtracting the depth of the shallowest depth at which oil was obtained from the depth at which water was obtained provides the length of the column of oil in the well. It is obvious that such an operation is a time consuming operation. In order to reduce time in obtaining such information electronic equipment has been employed to determine the depth at which a logging apparatus enters the oil layer and to determine the depth at which the apparatus leaves the oil layer and enters the water layer. As mentioned hereinbefore, such equipment is quite expensive because not only is there required expensive above-ground recording equipment but insulated electrical leads are required for connecting the actual logging apparatus with the above-ground apparatus.

My apparatus and method for obtaining such information are relatively simple. As an illustration of such an apparatus there is shown in the figure an elevational view, partly in section, of an apparatus suitable for achieving the objects of this invention.

In the drawing reference numeral 1 identifies an upper cylindrical case member and reference numeral 2 identifies a lower cylindrical case member. These case members are made preferably of stainless steel. An annular coupling member 8 is provided as illustrated. One end of this coupling member fits into the open end of the upper case member while the other end fits into the open end of the lower case member. This coupling member is provided with a flange 3 which separates the upper and lower case members from each other. One or more screws 9 maintain the upper case member attached to the coupling 8 while one or more screws 10 hold the lower case member in position on the coupling. Within the upper end of the upper case member is positioned a weighting member 5. This member is preferably made of brass and is intended to be heavy and weight the apparatus so that its descent in the oil or water in a well can be accurately measured. This brass member is held in position by one or more screws 40. To the upper end of this weighting member is an eye 4 for attachment of a wire line. Beneath the weighting member 5 is a space in which there is positioned a float 6. This float can be a hollow metal float or if desired it can be cork. In one instance the float was a cork float. On the under side of the float is attached a soft iron disk 7. If the float is made of metal it should preferably be constructed of a nonmagnetic material such as brass or copper. A plate or partition 12 is positioned across the diameter of the upper case 1. This plate 12 is actually positioned liquid-tight against the upper surface of the coupling member 8. Plate 12 is also made of a nonmagnetic material such as brass or copper. An O-ring seal 11 is positioned in the outer surface of the coupling 8 to prevent leakage of liquid between the outer surface of the coupling and the inner surface of the lower case 2 from the vicinity of the flange 3.

Mounted at about the position illustrated is a time clockworks 18 having a dial 19 and a pointer 20. Reference numeral 21 identifies preferably a relatively fast rotating clockwork wheel. A permanent magnet 13 is positioned in a central opening 41 within the annular coupling 8. This magnet is positioned quite close to the nonmagnetic plate 12. Supporting the magnet 13 is a pin or rod 14 of a nonmagnetic material, such as brass. Attached to the lower end of rod 14 by a screw 15 is a metal strap 16. This strap 16 is formed with its upper end being substantially horizontal, with a bended section for passing around a pivot post 17 and extending downward with also a bended section pointing toward and approaching the clockwork wheel 21. The horizontal section of metal strap 16 is only loosely attached to the bottom end of rod 14. In other words, magnet 13 and rod 14 move up and down freely. It is intended that as magnet 13 and rod 14 move upward the corresponding end of strap 16 also moves upward and pivots around pivot post 17 in such a manner that the lower end of the strap 16 contacts the clockwork wheel 21 which has sprockets 42 extending outward from its periphery. These sprockets or at least one of the sprockets upon rotation of clock wheel 21 upon contact with the adjacent end of strap 16 stops the clock.

Conversely, when magnet 13 and rod 14 move away from plate 12 the upper end of strap 16 moves downward and pivots the lower end of strap 16 away from the clockwork wheel 21 thereby allowing the clock to operate.

At the lower end of the apparatus is a metal plate 36, such as a brass plate. This brass plate is insulated by electrical insulation 38 from the lower end of the lower case 2. Attached to plate 36 and extending through insulation 38 is an electrical lead wire 35 which is connected to one terminal of a source 28 of electrical current. In one instance this source of electrical current was a pair of 30-volt batteries connected in series, thus making a total of 60 volts. The other terminal of batteries 28 is connected by a lead wire 29 to one terminal of a relay 30. The other terminal of relay 30 is connected by a lead 37 to the lower case 2 as a ground. Upon following around or tracing this electrical circuit the only place the electrical circuit is broken or open is at the lower end of the apparatus. The particular element forming a break in this circuit is the insulation 38 between lower case 2 and plate 36.

This circuit is closed merely by immersing the lower end of the apparatus in water which forms a connection between the lower case 2 and the plate electrode 36.

The relay in this apparatus is a solenoid relay having an armature 32. This armature member 32 is mounted on a blade or baffle 31 which rotates around a pivot post 33. It is preferable that baffle 31 be rotatably attached to the pivot post 33 which, in turn is mounted rigidly so that it will not move or rotate in any manner. However, in some cases and as illustrated in the drawing, baffle 31 actually rotates around the pivot post 33. In this case the baffle 31 extends beyond the pivot post 33 and a tension spring 34 pulls its end of baffle 31 to hold the main portion of the baffle in its inoperable position. The upper end of the baffle 31 is provided with a hook 27 for attaching to a pin 26. Pin 26 is attached to one end of a metal strip 22 as illustrated. This metal strip 22 is pivoted around a pivot post 24. On the top surface of the metal strip 22 is attached a resilient cushioned member 23 which in one instance was cork. This resilient cushion 23 was positioned on strap 22 so that upon upward movement of the strap the resilient cushion 23 would move upward and against the sprockets 42 of the clock wheel 21. A tension spring 25 is attached to the end of metal strap 22 on the side of pivot post 24 opposite the resilient cushion 23 so that as the pin 26 is freed from hook 27 spring 25 will move the resilient cushion 23 upward into contact with the sprockets 42 of the wheel.

The several pivot posts, the clockwork, the relay, the batteries, and the several spring supports are all mounted on an elongated plate 43 which runs vertically in the apparatus from the lower end of batteries 28 to the adjacent side of the brass coupling 8. This plate is attached to the adjacent side of the brass coupling by screws 44.

One or more openings 39 are provided in the upper case 1 adjacent the float 6 for admission of liquid into the chamber in which is positioned the float 6. The magnetic member or disk on the under side of the float is identified by reference numeral 7.

In the operation of this apparatus upon lowering into a well and into a body of oil the oil enters the float chamber through openings 39 and lifts the float 6 upward and away from the nonmagnetic plate 12. It will be realized that when the float 6 or rather when the magnetic plate 7 is resting against plate 12, plate 7 is sufficiently close to magnet 13 that the magnet 13 rises upward and remains against the lower surface of plate 12. Then when liquid enters the float chamber and lifts the float the plate or disk 7 is removed from the magnet such a distance that their magnetic attraction is reduced to such an extent that magnet 13 moves downward in the apparatus to about the position illustrated in the drawing. Thus when magnet 13 moves downward, rod 14 moves downward and the end of the metal strap 16 attached by screw 15 also moves downward thereby pivoting the opposite end of the metal strap away from the sprocket wheel 21 thereby allowing the timer to begin operation.

As also will be realized this timer has previously been wound and the pointer 20 either set at zero time or its position recorded manually by the operator. Preferably this timer is set or wound to such an extent that the pointer 20 will be pointing to the zero time marking on the dial 19. With the sprocket wheel 21 freed when the tool enters the oil layer then the timer begins counting time. Thus with the apparatus being lowered in the oil at a constant rate the timer keeps time until such a time as when the apparatus leaves the oil layer and enters water.

When the apparatus enters water in the well an electrical connection is made between the lower portion of the lower case 2 and the brass plate 36 thereby completing the circuit and energizing relay 30. Upon energizing relay 30 armature 32 is drawn toward the relay thereby releasing hook 27 from pin 26 and allowing tension spring 25 to rotate metal strip 22 thereby elevating the resilient cushion 23 to contact the sprockets 42 of wheel 21. When this cushion contacts the sprockets 42, clock wheel 21 obviously is prevented from rotating further.

Cushion 23 remains in contact with wheel 21 even when the apparatus is withdrawn from the layer of water because of the tension spring 25.

On withdrawing the apparatus from the well, it is merely necessary to remove screw or screws 10 and remove the lower case 2 from coupling 8 and observe the length of time recorded on dial 19. If for example eight and one-half minutes time are indicated on the dial then merely by multiplying this eight and one-half minutes by the number of feet per minute the apparatus was lowered in the well, the length of the oil column in the well becomes known.

For rechecking results of one determination of the depth of oil in the well or for preparing the apparatus for use in another well, it is merely necessary to replace hook 27 of baffle 31 around pin 26 thereby removing the resilient cushion 23 from contact with clockwork wheel 21. By providing several openings 39 in case 1, upon removing the apparatus from the oil in a well all or substantially all of the oil in the float chamber will be drained from the float chamber thereby allowing the float and the magnetic disk 7 to rest upon the plate 12. When the magnetic disk 7 is lowered against plate 12, disk 7 is sufficiently close to attract magnet 13 and the magnet will be raised upward against the lower surface of plate 12. When this movement occurs metal strap 16 pivots around pivot post 17 and the lower end of strap 16 contacts the clock wheel 21 thereby preventing its rotation. Also, the clock is then rewound and pointer 20 adjusted to the zero position as mentioned hereinabove. Then upon slipping the lower case 2 over the support plate 43 and the apparatus which it supports and inserting screw 10 the apparatus is then ready for use.

It is preferable in such apparatus that as many of the parts as possible should be constructed of corrosion resistant materials since such materials will be used in contact with oil which frequently contains corrosive materials and in contact with water which also is sometimes corrosive. As mentioned hereinbefore cases 1 and 2 are preferably made of stainless steel while support plate 43 is also made of stainless steel. Portions of clockwork are made of brass while other portions such as shafts for the little sprocket wheels are made of steel while the wheels themselves are ordinarily made of brass or other similar material.

Such a clock timer which I have found suitable for use in this apparatus is the works of an ordinary kitchen timer. Such a timer is wound merely by turning a dial to the zero point at which time the timer starts to tick. Then at any time when the timer stops a pointer on the dial will indicate the number of minutes elapsed from the starting point. In the present invention other apparatus than that used in the ordinary kitchen timer is used to start and to stop the operation of this clockwork. But one main point involved in selection of such a timer for use herein is that it is wound merely by turning a dial anti-clockwise as shown until the zero point on the face of the timer is reached by the pointer. The invention can be also utilized in well bores inclined to the vertical so long as the angle of inclination is known.

As mentioned hereinabove certain materials of construction and parts in this apparatus must be nonmagnetic, that is, metal parts in close proximity to the permanent magnet 13 must obviously be nonmagnetic with the exception of the intended magnetically susceptible disk 7. Thus, the coupling 8 and the plate 12 must obviously be of nonmagnetic materials.

While certain embodiments of the invention have been described for illustrative purposes, the invention obviously is not limited thereto.

I claim:

1. A method for determining the length of a column of oil in a well which is at a known angle with respect to the vertical, said well having a layer of oil floating on water comprising the steps of lowering a timing device into and through said layer of oil in said well at a uniform and known rate, starting said timing device upon the entry of said timing device into said layer of oil, stopping said timing device upon the entry of said timing device into said water, determining the length of time between said starting and said stopping of said timing device, multiplying said length of time by said known rate thereby providing a product indicating the depth of said layer of oil.

2. A method for determining the length of a column of oil in a substantially vertical well having a layer of oil floating on water comprising the steps of lowering a timing device into and through said layer of oil and into said water in said well at a uniform and known rate, said device comprising a clock, starting said clock upon entering said device into said oil and stopping said clock upon entering said device into said water, said clock thereby indicating the elapsed time required for passing through said layer of oil and multiplying said elapsed time by the known rate of lowering thereby yielding a value of the length of said column of oil in said well.

3. An apparatus comprising, in operable combination, an elongated tubular means adapted for lowering in a well, said means having an upper end and a lower end, said lower end being closed liquid-tight, a nonmagnetic diaphragm positioned liquid-tight across the cross section of said tubular means thereby providing an upper chamber and a liquid-tight lower chamber, an opening in the wall of said tubular means and into said upper chamber, a float provided with a magnetic member being positioned in said upper chamber, said magnetic member resting in its inoperable position on said diaphragm, a magnet in said lower chamber positioned at least near said diaphragm, said magnet in its inoperable position being attracted by said magnetic member and held against said diaphragm, a clockwork mounted in said lower chamber, a first linkage means operably connecting said magnet with said clockwork, a source of electrical current and a relay having an armature in said lower chamber, a first electrode on the lower end of said tubular means and insulated therefrom, one terminal of said source of current being connected to said first electrode, the other terminal of said source of current being connected with one terminal of said relay, the other terminal of said relay being grounded to said tubular means as a second electrode, a second linkage means communicating the armature of said relay with said clockwork, whereby said apparatus on entering a body of oil allows oil to enter said upper chamber thereby floating said float and releasing said magnet from the magnetic influence of said magnetic member, and upon release of said magnet said first linkage releases said clockwork to count time, and said apparatus upon entering a body of water completes an electrical circuit through the water, the source of current, the relay and the tubular means thereby actuating said second linkage means and stopping said clockwork from counting time.

4. An apparatus comprising, in operable combination, an elongated, liquid-tight tubular member adapted for lowering in a well, said member having an upper end and a lower end, a non-magnetic partition positioned normal to the axis of said member dividing same into an upper chamber and a lower chamber, an opening in the wall of said upper chamber for inlet and outlet of well liquid, a float provided with a magnetic member in said upper chamber, a magnet adjacent said partition on the side thereof facing said lower chamber, said magnetic member being adapted in its inoperable position to hold said magnet against said partition, clockwork mounted in said lower chamber, a first linkage operably connecting said magnet with said clockwork, an electrical circuit comprising an electrode insulated from said tubular member, a source of current, a relay and a ground electrode, said ground electrode being said tubular member, a second linkage operably connecting said relay with said clockwork, said apparatus upon being lowered into a body of oil allows oil to enter said upper chamber thereby floating said float and releasing said magnet from said magnetic member and actuating said first linkage thereby permitting said clockwork to begin counting time, and said tubular member upon reaching water short circuits the insulated electrode with said ground electrode, thereby energizing said relay and actuating said second linkage thereby stopping the time counting of said clockwork.

5. An apparatus comprising, in operable combination, an elongated, liquid-tight tubular member adapted for lowering in a well, a non-magnetic partition positioned normal to the axis of said member dividing same into an upper chamber and a lower chamber, an opening in the wall of the upper chamber for inlet and outlet of well liquid, a float having a magnetic member attached thereto positioned freely in said upper chamber, a magnet positioned in said lower chamber adjacent said partition, said magnet and said magnetic member being adapted in their inoperable positions to attract each other and to hold said magnet and said float against their respective sides of said partition, a clockwork mounted in said lower chamber, a first linkage operably connecting said magnet with said clockwork, said magnet in its inoperable position maintaining said first linkage into contact with the works of said clockwork thereby maintaining said clockwork inoperative, an electrical circuit comprising an electrode insulated from said tubular member, a source of current a relay and a ground electrode, said ground electrode being said tubular member, a second linkage operably connecting said relay with the works of said clockwork, said apparatus upon being lowered into a body of oil allows oil to enter said upper chamber thereby floating said float and releasing said magnet from said magnetic member and actuating said first linkage thereby permitting said clockwork to begin counting time, and said tubular member upon reaching water short circuits the insulated electrode with said ground electrode thereby energizing said relay and actuating said second linkage thereby stopping the time counting of said clockwork.

6. An apparatus comprising, in operable combination, an elongated liquid-tight tubular member adapted for lowering in a well, a timing device in said member, means for starting said timing device upon said apparatus entering a body of oil in said well, means for stopping said clock upon said apparatus entering a body of water below said body of oil, thereby indicating the elapsed time required for passing through said body of oil.

7. An apparatus comprising, in operable combination, an elongated tubular member a portion of which is liquid-tight, said member being adapted to be lowered in a well, a time clock in the liquid-tight portion of said member, a magnetically actuated means communicating with said time clock for starting same upon said apparatus entering oil, a battery operated means in said liquid-tight portion for stopping said time clock upon said apparatus entering water beneath oil in a well, said time clock marking time only while said apparatus is positioned in oil.

8. An apparatus comprising, in operable combination, an elongated tubular member having its lower end liquid-tight and its upper end open, said member being adapted to be lowered in a well, a time clock in the liquid-tight end of said member, a magnetically responsive float in said upper open end of said member, a magnetic means for starting said clock and a battery operated means for stopping said clock in said liquid-tight end of said member, said magnetically responsive float and said magnetic means being magnetically attracted toward each other when the time clock is in its inoperable condition, said magnetic responsive float being adapted to release said magnetic means thereby allowing said time clock to start upon said apparatus being positioned in oil and said battery operated means being adapted to stop said time clock upon said apparatus being positioned in water while said clock was in operation, whereby said time clock marks time only while positioned in oil.

References Cited in the file of this patent
UNITED STATES PATENTS 2,302,536     Edwards _____ Nov. 17, 1941

UNITED STATES PATENT OFFICE
CERTIFICATE OF CORRECTION

Patent No. 3,119,265                                              January 28, 1964

Ernest L. Clark

It is hereby certified that error appears in the above numbered patent requiring correction and that the said Letters Patent should read as corrected below.

Column 6, line 60, for "current" read -- current, --; column 7, line 3, for "clock" read -- timing device --.

Signed and sealed this 30th day of June 1964.

(SEAL)
Attest:

ERNEST W. SWIDER
Attesting Officer

EDWARD J. BRENNER
Commissioner of Patents